Nov. 11, 1958 H. L. STADLER 2,860,322

BARIUM TITANATE MEMORY DEVICE

Filed May 25, 1956

INVENTOR
H. L. STADLER
BY
H. O. Wright
ATTORNEY

United States Patent Office 2,860,322

Patented Nov. 11, 1958

2,860,322

BARIUM TITANATE MEMORY DEVICE

Henry L. Stadler, Berkeley Heights, N. J., assignor to Bell Telephone Laboratories, Incorporated, New York, N. Y., a corporation of New York Application May 25, 1956, Serial No. 587,410

2 Claims. (Cl. 340—173)

Figure 1:
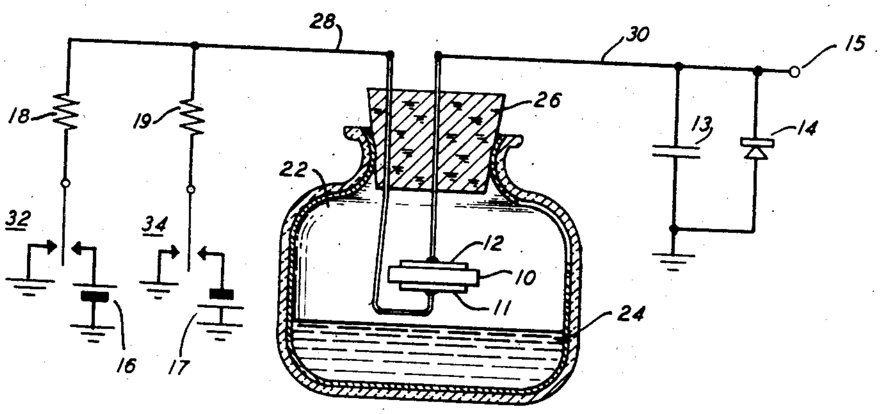

This invention relates to barium titanate memory devices. More particularly it relates to the combination with such devices of means for maintaining the devices at temperatures substantially below 0° C. to eliminate decay of the devices during normal operation as memory devices.

Barium titanate devices show great promise for use as computer memory devices and the like, in view of their low power consumption, short access time, short switching time, small size and low cost. However, all such devices having solid electrodes and otherwise satisfactory initial electrical characteristics made heretofore have proven unstable in that they are subject to "decay" (i. e. loss of polarization) when subjected to repeated computer electrical pulse sequences. It has been found that no "decay" of these devices under repeated pulsing occurs if they are subjected to and maintained at sufficiently low temperatures and that devices having favorable initial characteristics (aside from the propensity toward decay) do not suffer serious impairment of such initial characteristics when treated and pulsed at the low temperatures prescribed in accordance with the present invention.

Accordingly, a principal object of the invention is to eliminate the propensity toward decay or loss of polarization of barium titanate memory devices under repeated pulsing without seriously impairing the other initial characteristics of the devices.

Other and further objects, features and advantages of the invention will become apparent during the course of the following detailed description of an illustrative embodiment of the invention and from the appended claims.

Figure 2:
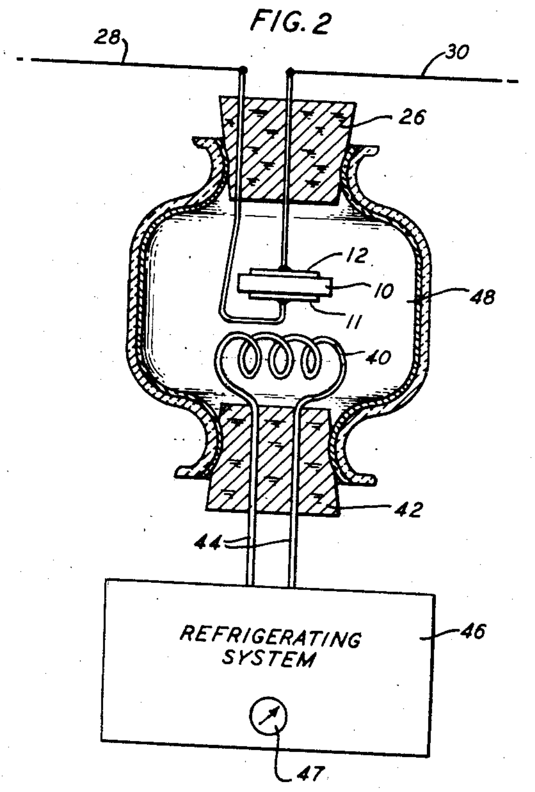

In the drawing,

Fig. 1 represents, in schematic form, a barium titanate memory device in combination with one means for maintaining the temperature of the barium titanate crystal at a value substantially below 0° C.; and Fig. 2 illustrates in diagrammatic form a second arrangement for controlling the temperature of the crystal of barium titanate.

Except for the last-stated means, the circuit of Fig. 1 is substantially identical with Fig. 2A of United States Patent 2,717,372, granted September 6, 1955, to J. R. Anderson, assignor to applicant's assignee.

The diagram of Fig. 1 illustrates the basic circuit, known as a memory circuit or device, for the storage of the binary digits "1" and "0," by way of example, and comprises a barium titanate crystal 10, to the opposite sides of which conductive electrodes 11 and 12 are affixed, as shown. The crystal thickness may, by way of example, be 0.010 inch and electrodes 11 and 12 may each be 0.020 inch in diameter. For the purposes of the present invention, electrodes 11 and 12 are preferably of silver, gold, copper, platinum or other conductive materials which do not tend to oxidize rapidly at room temperatures under average atmospheric conditions.

Capacitor 13 is connected, via lead 30, between electrode 12 and ground. Across capacitor 13, a diode 14, suitably of germanium or copper oxide, is connected, as shown.

Voltage appearing across capacitor 13 is supplied at terminal 15, via conductor 30, to a desired utilization circuit, not shown.

Positive or negative voltage pulses may be applied to crystal 10, via lead 28 connected to electrode 11, from battery 16 or battery 17, respectively, via their respective associated single pole, double throw switches 32 and 34, and series resistors 18 or 19, respectively, as shown. Any of numerous other pulse generators, well known to those skilled in the art, can obviously be used in place of the battery-switch arrangements illustrated.

To explain, in part, the operation of this memory device, we will assume, for example, that a positive pulse of sufficient amplitude to drive crystal 10 to its positive saturation polarization is applied and, when the pulse terminates, the polarization will recede to its positive remanent value (see hysteresis loop shown in Fig. 1 of Anderson's above-mentioned patent where C is the positive saturation polarization and A is the positive remanent value). No external charge remains on electrodes 11 and 12 but the remanent polarization should persist within the crystal after the voltage across it has returned to zero. It will be assumed, further, that a negative pulse corresponds to the binary digit "1" and that no pulse corresponds to the binary digit "0." To store the binary digit "0," therefore, the polarization is simply left at its positive remanent value.

Now, if a negative pulse is applied to crystal 10, which pulse is equal in amplitude to the positive pulse which initiated the polarization of the crystal, the polarization of the crystal will be carried to its negative saturation polarization and at the end of the pulse will recede to its negative remanent polarization value (points D and B of Fig. 1 of Anderson patent, supra) whereupon the binary digit "1" is said to be stored in the memory device in the form of the negative remanent polarization of crystal 10. The application of pulses to "store" and/or to "read out" (see infra) appropriate crystal polarizations is termed "pulsing" of the crystal. While for an initially "good" barium titanate crystal, prior to repeated pulsing of the crystal, these polarizations will persist for several days at normal room temperatures, in most instances during repeated pulsing of the crystal, the polarization imposed upon the crystal decays or diminishes rapidly from pulse to pulse so that a correct "read out" of the stored information can no longer be depended upon.

The reading out of the binary digits "1" and "0," when stored as described above, is explained in detail in the above-mentioned patent to Anderson and will not be repeated here, since the present invention is concerned with the prevention of the decay of the polarization of the crystal between storage and read out operations, after the crystal has been subjected to repeated pulsing operations.

In accordance with the present invention, if the crystal is subjected to an extremely low temperature, such for example as −195° C., and thereafter its temperature is maintained at a value substantially lower than 0° C., no decay of its polarization, nothwithstanding repeated pulsing, will occur for a substantial proportion of units.

Accordingly, in Fig. 1 of the drawing, the crystal 10 is shown enclosed in a Dewar flask 22, or other efficient thermally insulated container, having a removable stopper 26, suitably of cork, through which the electrical leads 28 and 30 connecting to electrodes 11 and 12, respectively, can conveniently be introduced, as shown.

A cooling agent 24, which can, by way of examples, be Dry Ice or liquid nitrogen, is also enclosed within flask 22 to lower the temperature of the crystal and its immediate environment. With Dry Ice a temperature of substantially —50° C. can be maintained. With liquid nitrogen a temperature of —195° C. can be maintained.

Alternatively, as shown in Fig. 2, a refrigerating coil 40 connected through pipes 44, passing through stopper 42, to any suitable conventional source 46 of refrigerant, having a temperature control 47, can be included within the thermally insulated enclosure 48 and the desired temperatures within the enclosure can be established and varied as desired, in accordance with practices well understood by those skilled in the art.

A thermometer, or other temperature indicating device, not shown, can, of course, be associated with the devices of the invention, in accordance with principles well understood by those skilled in the art, to afford indications of the temperature prevailing within the enclosure 22 or 48.

In accordance with the present invention, if barium titanate crystals are lowered to a temperature in the neighborhood of —195° C. and maintained at that temperature, substantially all such crystals will be found to be free from decay (loss of polarization) regardless of how many pulsing cycles or the character of the pulsing cycles to which they are subjected.

Also, in accordance with the present invention, if barium titanate crystals are lowered to —195° C. and thereafter permitted to "warm up" to any temperature lower than substantially —10° C., an appreciable percentage, for example sixty percent or more, of the crystals will still be found to be free from decay regardless of how many pulsing cycles or the character of the pulsing cycles to which they are subjected.

In substantially all instances of operation below 0° C., barium titanate crystals have been found to retain, without substantial impairment, their desired initial characteristics, for example, their low power consumption, fast switching time, fast access time and the like.

The reasons for the observed performance of the crystals, as above described, are as yet not understood and accordingly no theoretical explanations are being presented in the present application.

Numerous and varied other applications and arrangements within the spirit and scope of the present invention will readily occur to those skilled in the art. No attempt has here been made to exhaustively cover all such applications.

What is claimed is:

1. The method of eliminating decay under repeated pulsing, of the polarization of a barium titanate crystal which comprises cooling said crystal to substantially —195° C. and thereafter maintaining said crystal at a temperature substantially below 0° C.

2. The method of eliminating decay of the polarization of a barium titanate crystal under repeated pulsing which comprises cooling said crystal to substantially —195° C. and maintaining said crystal at said temperature.

References Cited in the file of this patent

UNITED STATES PATENTS

| | | |
|---|---|---|
| 1,960,415 | Miller, jr. | May 29, 1934 |
| 2,648,823 | Kock et al. | Aug. 11, 1953 |
| 2,717,372 | Anderson | Sept. 6, 1955 |